April 8, 1930.　　　　　D. C. WEST　　　　　1,753,958
CONTROL SYSTEM
Filed July 7, 1928　　2 Sheets-Sheet 1
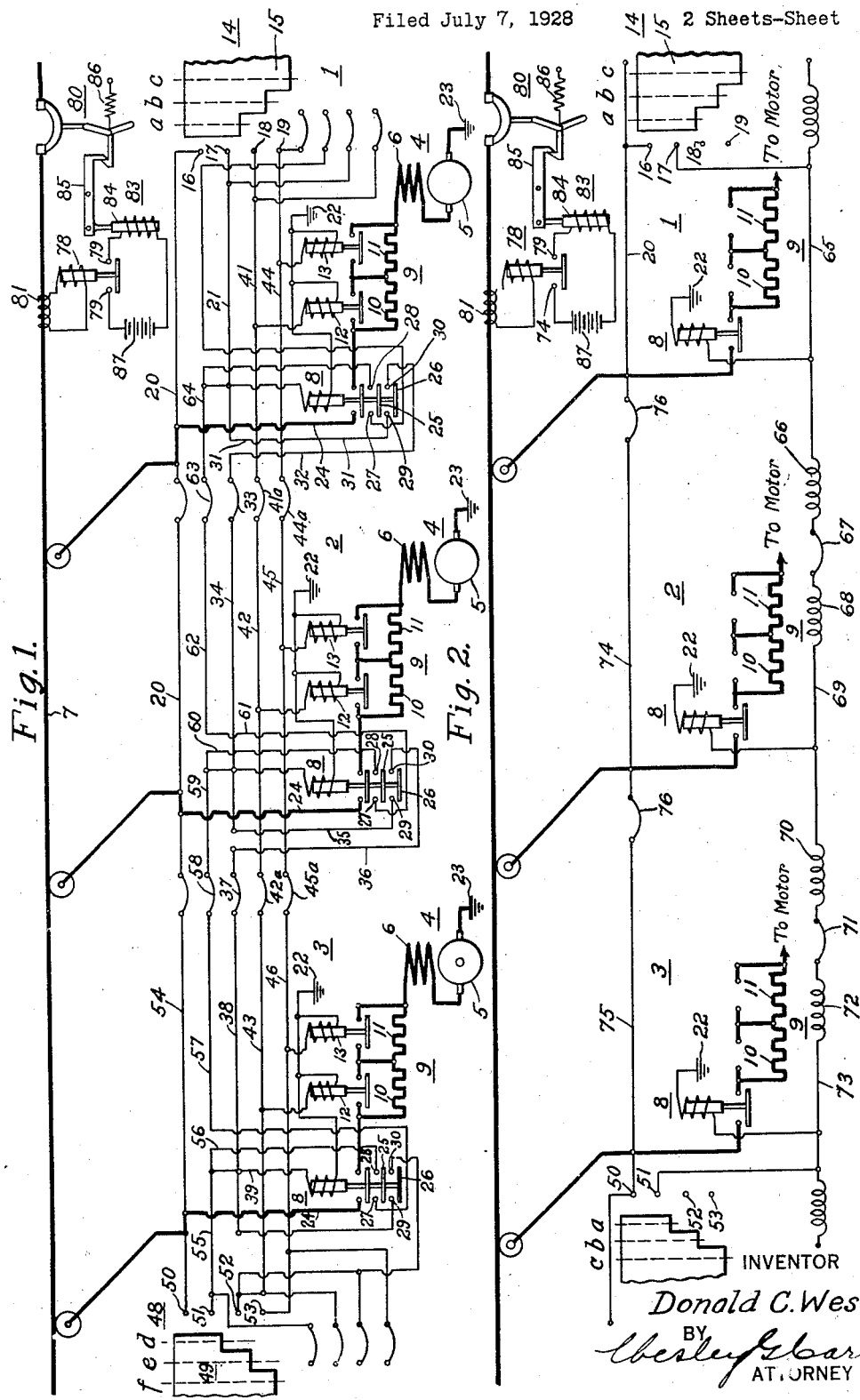
INVENTOR
Donald C. West.
BY
Chesley G. Carr
ATTORNEY Patented Apr. 8, 1930

1,753,958

UNITED STATES PATENT OFFICE

DONALD C. WEST, OF EAST PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed July 7, 1928. Serial No. 290,995.

This invention relates to control systems, and particularly to systems for governing the operation of a plurality or train of motor vehicles.

In accordance with the prior art, when starting and accelerating a train of motor vehicles from rest, the accelerating resistors provided for the respective motors are connected in series with the motors and all the motors connected simultaneously to the power supply when the master controller is actuated to the first "on" position, or the first "notch". Under these conditions, and when the train is near a substation, from which it receives its power, a sudden abnormal rush of current is drawn from the source of power suply that is equal to short-circuit currents resulting from faults occurring at points in the system remote from the source of power supply or substation.

The source of power supply and the feeder system may be protected from short-circuits or grounds, by relays, some of which, or most of which operate in response to the rate and nature of rise of current drawn from the source of power supply. In order to protect the equipment and the feeder system these relays may be adjusted to trip the feeder breaker, to disconnect the system from the source of supply, in response to an excessive rise of current incident to a fault or short circuit occurring at a point remote from the power source. Since the circuit established on the occurrence of a short circuit will include the resistance and inductance of the feeder system intervening between the power source and the fault, both the magnitude and rate of rise of the short circuit current will be relatively low.

It is obvious, therefore, that, when a plurality of motors in one or more trains of motor vehicles are connected to the source of supply substantially simultaneously, both the magnitude and the rate of rise of current at the source of power will approximate or exceed the current values which occur under certain short-circuit conditions. even though the current demanded by each of the motors on the respective cars or vehicles has not exceeded a normal value. Since either or both the magnitude and the rate of rise of current in the power supply, when all of the motors are connected to the source of supply simultaneously, may be approximately equal to or even greater than the values existing under certain short-circuit conditions then the protective relays will function to disconnect the feeder system from the power source, but at an improper time. That is, they will not be able to distinguish between short-circuit conditions in the power supply, and the current-demand conditions incident to the starting of a train or trains from rest.

The object of the invention, generally stated, is the provision of a control system for a train of motor vehicles that shall be simple and efficient in operation and easily manufactured and installed.

A more specific object of the invention is to provide for connecting the respective motors of a plurality or train of motor vehicles to a source of electric power in a predetermined sequence, and the subsequent acceleration of all the motors at substantially the same rate.

Another object of this invention is to provide for controlling the rate of rise of current drawn from a power-supply system incident to the starting of a train of motor vehicles from rest.

A further object of the invention is to provide for the control of a plurality of motor vehicles constituting a train, from any selected vehicle in the train.

A further object of the invention is to provide for connecting the motors of the different vehicles of a train across the line in a predetermined sequence in order to limit the induced voltage impressed upon the protective relays which are responsive to a predetermined rate of rise of current flowing in the feeder circuit.

A further object of the invention is to provide for connecting the motors of the different vehicles of a train across the line in a predetermined sequence in order to prevent the establishment of electrical conditions in the feeder circuit which will cause the operation of the protective relays.

Other objects of the invention will, in part, be obvious and will, in part, appear hereinafter.

The invention, accordingly, is disclosed in the embodiment thereof shown in the accompanying drawings, and comprises the structural features, the combination of elements and the arrangement of parts that will be exemplified in the structure hereinafter set forth and the scope of the application of which will be indicated in the claims.

For a fuller understanding of the invention, reference may be had to the following description, taken in conjunction with the accompanying drawing, in which;

Figure 1 is a schematic illustration of circuits and apparatus embodying the invention;

Fig. 2 is a schematic illustration of a modification of the invention shown in Fig. 1.

Figure 3:
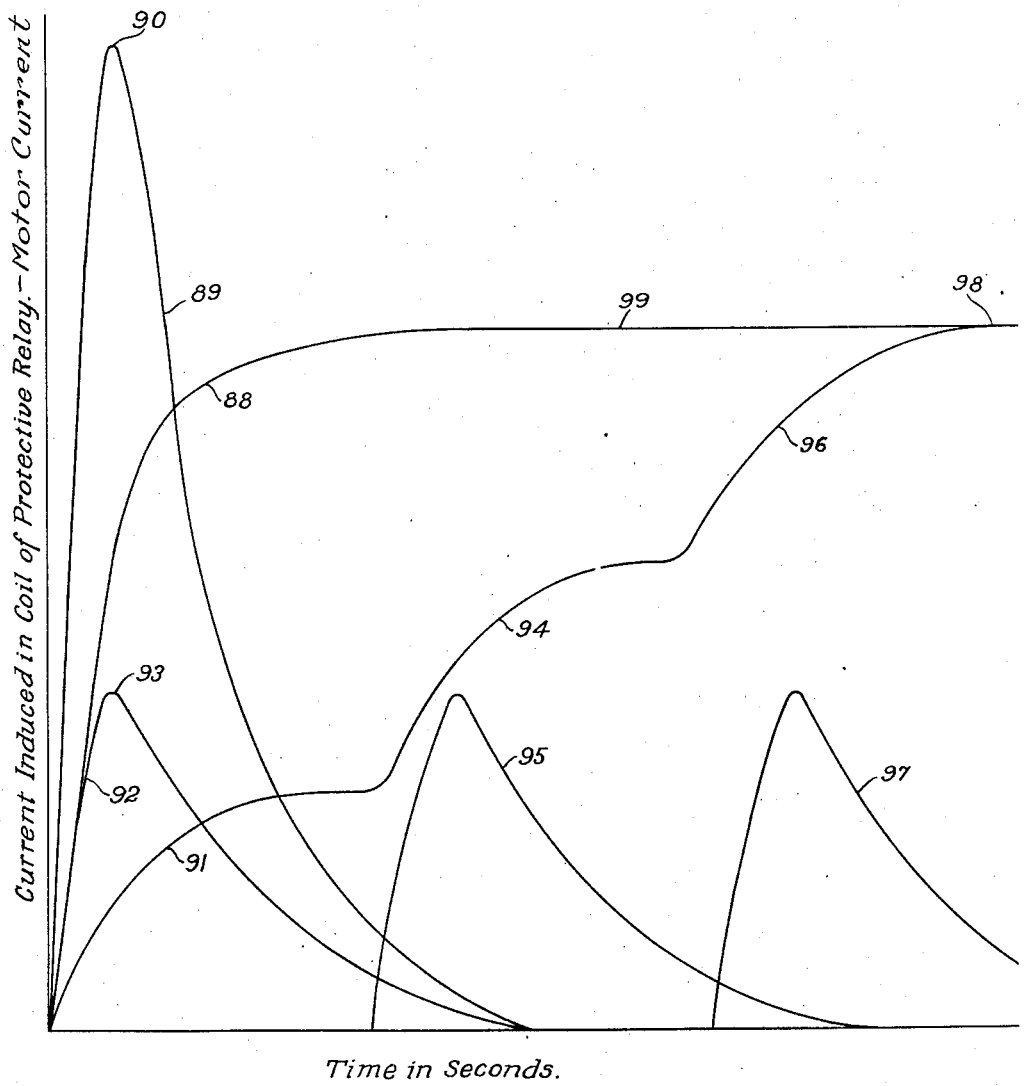
Fig. 3 illustrates, by means of graphs, the electrical conditions established in the feeder circuit when all the motors of a train are simultaneously connected to the feeder circuit and when they are connected to the feeder system in a predetermined sequence in accordance with this invention.

In electric-railway-transportation systems, it is usual practice to provide the individual cars, constituting the train, with motors, control apparatus, control circuits and a master controller for governing the energization of the control circuits, whereby the acceleration and operation of the train may be governed from any selected car, usually the leading car.

It has also been the practice to connect the motors of the respective cars to the source of electric-power supply simultaneously when the master controller is actuated to its first "position".

In order, therefore, to limit the rate of rise and magnitude of the increments of current in the power supply to the normal accelerating current demanded by one motor or a group of motors on any car of the train, each of the cars is provided with a control circuit so arranged that the motor or motors of the individual cars are connected in a predetermined sequence when the controller is set in the first "on" position.

If a train of five cars is being controlled from a master controller and each car is provided with a single motor, the control circuit governed by the master controller is then so arranged that, when the controller is set in the first "on" position, only one motor at a time will be connected to the source of supply. A motor on one car will be first connected to the source of supply, and then the motors on the remaining cars will be connected in a predetermined sequence until all of the motors have been connected to the source of supply.

When the motors have thus been connected to the source of supply and the controller is in its first "on" position, they may be accelerated at substantially the same rate by actuating the controller from its first "on" position, through its intermediate positions, to its full-running position, whereby the sections of the resistors connected in series with the motors and power supply are short-circuited in a manner well known in the art.

In the present embodiment of the invention, a train-control system is provided, whereby operation of a train composed of a plurality of motor vehicles 1, 2 and 3, (see Figs. 1 and 2) may be effected from a selected vehicle, and, for purposes of description, it will be assumed that the train is to be controlled from vehicle 1.

In order that the description of the construction and operation of this particular embodiment of the invention may be simplified, only the vehicle 1 will be described in detail, and like apparatus or parts appearing in the vehicles 2 and 3 will be designated by corresponding reference characters.

As shown in Fig. 1 of the drawing, the selected vehicle 1 is provided with a propelling motor 4 of any suitable type. The particular motor illustrated is a series motor having an armature 5, a series field winding 6 that may be connected to a trolley conductor 7 by means of a line switch 8.

As is the usual practice, the motor 4 may be provided with an accelerating resistor 9 that is connected in series with the motor armature and the field winding when the line switch 8 is closed. In order that sections 10 and 11 of the resistor 9 may be shunted out of the motor circuit, as the motor speed increases, to obtain a uniform tractive effort from the motor during its accelerating period, resistor-short-circuiting switches 12 and 13 are provided.

The actuating coils of the line switch 8 and the resistor-short-circuiting switches may be energized from the trolley conductor 7 or any other suitable source of electric power supply, and the sequence of operation controlled by a master controller 14. The master controller 14 comprises a segment 15 having portions thereof so arranged that stationary contact fingers 16 to 19, inclusive, may be engaged thereby as the segment 15 is successively set in positions a, b and c.

Assuming that it is desired to start the train constituted by the vehicles 1, 2 and 3, the controller 14 is set in position a or its first "on" position, in which position the stationary contact fingers 16 and 17 are bridged by the controller segment 15. When the controller is in this poistion, current flows from the trolley 7, through a train line conductor 20, stationary contact fingers 16 and 17—bridged by the controller segment 15—a train line conductor 21 and the actuating coil of the line switch 8, to ground at 22. Therefore, the switch 8 is closed and the motor 4 is connected in series with the accelerating resistor 9 between the trolley 7 and ground at 23. The circuit of the motor may be traced from the trolley 7, through train line conductor 20, conductor 24, line switch 8, accelerating resistor 9, series field winding 6 and the armature winding 5, to ground at 23.

The line switch 8 is provided with contact-bridging members 25 and 26, that are disposed to engage the pairs of stationary contact fingers 27 and 28 and 29 and 30, respectively, when the line switch is in its circuit-closing position.

When the line switch 8 on vehicle 1 is closed, an actuating circuit for the line switch 8 on vehicle 2 is established which may be traced from the train line conductor 21, through conductor 31, stationary contact fingers 29 and 30—bridged by the contact-bridging member 26—conductor 32, train-line jumper 33, train-line conductor 34 and the actuating coil of line switch 8 on vehicle 2, to ground at 22. Therefore, the line switch 8 on vehicle 2 is closed, and a circuit for the motor 4 of vehicle 2 is established, which extends from the trolley 7 to ground at 23, and corresponds to the circuit traced for the motor 4 in vehicle 1.

When the line switch 8 on vehicle 2 is closed, a circuit is established which extends from train-line conductor 34, through a conductor 35, stationary contact fingers 29 and 30—bridged by contact-bridging member 26—conductor 36, train line jumper 37, train line conductor 38, conductor 39 and the operating coil of the line switch 8 of vehicle 3, to ground at 22. Therefore, when the line switch 8 of vehicle 3 is closed a circuit is established for motor 4 of this vehicle, which is identical with the circuit of motor 4 of vehicle 1, previously traced herein.

When the controller 14 is set in position $b$, train-line conductors 41, 42 and 43, electrically connected by jumpers 41a and 42a, respectively, are connected to the trolley 7 through the contact segment 15 of the controller.

When the train-line conductors 41, 42 and 43 have been connected electrically to the trolley conductor, the operating coils of the short-circuiting switches 12 of the respective vehicles 1, 2 and 3 are energized, thereby shunting or short-circuiting the section 10 of the respective resistors 9. The energizing circuit for the switch 12 on vehicle 1 may be traced from train-line conductor 41, through the operating coil of the switch 12, to ground at 22. The energizing circuit for the operating coil of the switch 12 on vehicle 2 may be traced from the train-line conductor 42, through the operating coil of the switch 12, to ground at 22 and the energizing circuit for the operating coil of switch 12 on vehicle 3 may be traced from train line conductor 43, through the coil of the switch 12, to ground at 22.

Since the train-line conductors 41, 42 and 43 are energized simultaneously, it is apparent that the switches 12 on the respective vehicles 1, 2 and 3 will be closed substantially simultaneously also. When the sections 10 of the resistors 9 have been shunted or short-circuited, the voltage on the motors 4 is increased, also, their speed, and the train of vehicles is accelerated in a manner well-known in the art.

When the controller 14 is set in position $c$, the train-line conductors 44, 45 and 46—electrically connected by jumpers 44a and 45a—are connected to the trolley 7 through the controller segment 15 of the controller 14. When these train-line conductors have been energized, the operating coils of the short-circuiting switches 13 of the vehicles 1, 2 and 3 are energized to close the switches and effect a short-circuiting or shunting of the section 11 of the respective resistors 9. Full voltage is, therefore, impressed upon the motors 4, and the train is accelerated to its full running speed.

The energizing circuit for the operating coil of the resistor-short-circuiting switch 13 on vehicle 1 may be traced from train-line conductor 44, through the operating coil of the switch, to ground at 22. Similarly, the energizing circuits for the switches 13 on vehicles 2 and 3 may be traced from the respective train line conductors 45 and 46 to ground at 22.

From the foregoing description, it is apparent that, when the controller 14 is set in position $a$, the motor 4 of vehicle 1 is first connected to the trolley 7 for energization, responsive to the closing of the line switch 8. When the line switch 8 on vehicle 1 has been closed, the line switch 8 on the vehicle 2 is closed, and the motor of that vehicle is connected, for energization, to the trolley 7. Likewise, when the line switch 8 of the vehicle 2 has been closed, the line switch 8 of vehicle 3 will be actuated to connect the motor 4 of that vehicle to the trolley 7 for energization. Therefore, it is obvious that the motors of the vehicles 1, 2 and 3 are connected, in a predetermined sequence, to the trolley conductor 7 when the controller 14 is set in its first "on" position or position $a$. When the motors are connected to the trolley conductor, in a predetermined sequence, the current in the motor first connected to the trolley will be decreased, as a result of the counter-electromotive force generated, if the motor is accelerated, before the next motor is connected to the trolley conductor, and so on.

If it is desirable to control the train of vehicles 1, 2 and 3 from vehicle 3, a controller 48, having a contact segment 49 similar to the contact segment 15 of controller 14, may be provided. The controller 48 is positioned to engage a plurality of stationary contact fingers 50 to 53, inclusive, as it is successively set in its controlling positions $d$ to $f$, inclusive.

When the controller 48 is set in position $d$, a circuit is established from the trolley conductor 7, through train-line conductor 54, contact fingers 50 and 51—bridged by the contact segment 49—train-line conductor 55, operating coil of the line switch 8 of vehicle 3, to ground at 22, whereupon the line switch 8 is closed and a circuit is established for motor 4 of vehicle 3 from trolley 7 to ground at 23, as hereinbefore described.

When the switch 8 of vehicle 3 is closed, a circuit is established from trolley conductor 7, through the controller 48, train-line conductor 55, conductor 56 and contact fingers 27 and 28—bridged by contact bridging member 25—conductor 57, jumper 58, train-line conductor 59 and the operating coil of line switch 8 of vehicle 2, to ground at 22. Therefore, the line switch 8 of vehicle 2 is closed, and the motor 4 thereof is connected between trolley and ground by a circuit which has been traced hereinbefore.

Upon the closing of line switch 8 of vehicle 2, a circuit is established from train-line conductor 59, through conductor 60, stationary contact fingers 27 and 28—bridged by contact bridging member 25—conductor 61, train-line conductor 62 of vehicle 2, train-line jumper 63, train-line conductor 64 of vehicle 1 and operating coil of line switch 8 of vehicle 1, to ground at 22. Therefore, the line switch 8 of vehicle 1 is closed, and the motor 4 thereof is connected between trolley 7 and ground at 23, by means of a circuit which has been traced.

While the circuits and apparatus of Fig. 1 are so arranged that the motors of vehicles 1, 2 and 3 are connected in the sequence of motor 4 of vehicle 1 to motor 4 of vehicle 3, when the controller 14 is set in the position $a$, it is to be understood that the circuits may be so arranged as to connect the motors to the trolley in any predetermined sequence.

It is to be understood also that, while the motors of the vehicles 1, 2 and 3 have not been provided with switches for causing the motors to operate in either a forward or reverse direction, reversing switches for the motors may be provided. These switches have been omitted from the drawings for the purpose of simplifying the circuits and control apparatus, and to curtail the length of the description.

In Fig. 2 of the drawings a modification of the circuits and apparatus illustrated in Fig. 1 for accomplishing the same purpose is illustrated. In this figure, the resistor-shunting switches and the motors 4 have not been illustrated and only so much of the circuits is shown as is necessary to close the line switches 8 of the vehicles 1, 2 and 3 in a predetermined sequence.

When the controller 14 is set in position $a$, a circuit is established from the trolley 7, through train-line conductor 20, contact fingers 16 and 17—bridged by contact segment 15—train-line conductor 65 and the operating coil of line switch 8, to ground at 22. Therefore, the line switch 8 is closed, and a circuit is established from the trolley 7, through the resistor 9 and the motor 4 (not shown), to ground at 23; a circuit which has been traced and shown in Fig. 1. When the controller 14 has been set in position $a$, current flows from the trolley 7 through the controller 14, train-line conductor 65, a reactance coil or current-limiting device 66, train-line jumper 67, reactance coil 68 on vehicle 2, train-line conductor 69 and the line switch 8 of vehicle 2, to ground at 22. It is to be understood that the reactance of the coils 66 and 68 is such that the current through the operating coil of line switch 8 on vehicle 2 is retarded to such an extent that this switch closes a short time after the line switch 8 on vehicle 1 has been closed.

Current also flows from the energized train-line conductor 69, through a reactance coil 70 on vehicle 2, train-line jumper 71, reactance coil 72 of vehicle 3, train-line conductor 73 of vehicle 3 and the operating coil of line switch 8, to ground at 22. The purpose of the reactance coils 70 and 72 is to retard the flow of current through the operating coil of the line switch 8 of vehicle 3 to such an extent that this switch will not close until the switch 8 on vehicle 2 has been closed. The vehicles 2 and 3 may be provided with train-line conductors 74 and 75 that are connected in series with the train-line conductor 20 by means of train-line jumpers 76 and 77. These train-line conductors may be utilized for carrying the current from the trolley conductor through the motors 4 of the vehicles, in the event that only one trolley or current collector is provided.

While the vehicles 1 and 3 only of Figs. 1 and 2 have been provided with controllers 14 and 48, respectively, it is to be understood that each vehicle may be provided with two controllers, one at each end thereof, so that any one of the vehicles may be used as the selected vehicle from which the operation of the train may be controlled. These controllers have been omitted from the drawings in order to simplify the circuits and to avoid obscuring the invention.

In order to protect generating equipment (not shown), that supplies power or electric energy to the trolley conductor 7, and also to protect the feeder system from short-circuit conditions, relay 78 responsive to change of current in conductor 7, having contacts 79 is provided for controlling the operation of a circuit-breaker mechanism 80.

The relay 78 may be inductively coupled to the trolley 7 through an impulse coil or transformer 81 so that the voltage induced therein will be proportional to the rate of rise of current flowing in the trolley conductor 7. The transformer 81 may be permanently connected to the operating coil of relay 78.

The relay 78 may be set to operate in response to the current increment incident to a fault at the most remote point on the feeder section supplied by circuit breaker 80.

It will then operate to trip the breaker on a fault located at any other point on the feeder section, because the contacts 79 control the energization of a solenoid 83 having a core 84 that is pivotally connected to a latching lever 85. The lever 85, when in the position shown in Figs. 1 and 2 of the drawings, is adapted to latch the circuit breaker 80 in a circuit-closing position. If a core 84 is drawn downwardly, the latch 85 releases the circuit breaker 80 to a circuit-opening position, the circuit breaker being actuated thereto by a spring 86 or other suitable means.

When the contacts 79 have been closed in response to the rise of current of a predetermined characteristic in the trolley 7, the solenoid 83 is connected for energization to a battery 87 or other suitable source of power.

If the motors on the vehicles 1, 2 and 3 should be connected to the trolley conductor 7 for energization simultaneously upon the setting of the controller 14 in position $a$, then the characteristic of the rate of increase of current taken by the motors from the trolley 7 would be represented by a curve 88, (see Fig. 3). A current, traversing the trolley 7, and rising as indicated by the curve 88 would cause a current to be generated in the transformer 81 characterized by a curve, 89, the peak value of which is indicated at 90. A current in the transformer 81 of the value indicated at 90 will, in many cases, be equal to or greater than the value of current which would be induced as the result of a remote short-circuit between the trolley 7 and ground. Since it is the purpose of the relay 78 to protect the generators and feeder system (not shown), from short-circuit conditions, the relay 78 will operate to open the circuit breaker 80 when a predetermined induced current flows through its coil. This would be undesirable because, in reality, no short circuit exists between trolley and ground when the motors are connected to the trolley for energization simultaneously, and to have the circuit breaker 80 disconnect the trolley from the source of supply of electric power would be undesirable.

Therefore, as hereinbefore stated, in order to decrease the rate of rise of current drawn from the trolley conductor 7 when the controller 14 is set in position $a$, or the first "on" position, motor 4 of vehicle 1 is first connected to the trolley conductor for energization. The rate of rise of current drawn by this motor may be represented by a curve 91, and the current induced in the transformer 81 may be represented by a curve 92 having a peak value, as indicated at 93, which is approximately one-third of the value as indicated at 90, there being three motors ultimately connected to the trolley conductor in both cases, but, in the latter, only one motor is connected to the trolley conductor at a time.

After motor 4 of vehicle 1 has been connected to the trolley, motor 4 of vehicle 2 is connected thereto, and the rate of rise of current through this motor is represented by a curve 94 substantially equal and similar to the curve 91. Again, the current induced in the transformer 81 by the current drawn by motor 4 of the vehicle 2, is represented by a curve 95 having a peak value substantially equal to that of the curve 92.

Similarly, when the motor 4 of vehicle 3 has been connected to the trolley conductor, the current drawn from the source of supply by this motor may be represented by a curve 96, which also is similar to the curves 91 and 94. As in the other cases, the current induced in the transformer 81 is represented by a curve 97 similar to curves 92 and 95. When all of the motors have been connected to the trolley and assuming that the vehicle has not yet commenced to move, so that the armatures of the motors are not yet rotating, the current will reach a constant value, as indicated at 98. As soon as the motors begin to rotate and generate counter-electromotive force, this value of current will, of course, be decreased as the speed is increased.

If all of the motors are connected simultaneously to the trolley conductor 7, the current finally reaches a constant value, as represented by the horizontal portion 99 of the curve 88. As the current approaches the constant value, the voltage induced in the transformer 81 falls rapidly to zero.

Further, if the motors 4 of the vehicles 1, 2 and 3 are connected to the trolley conductor 7 in a predetermined sequence, as hereinbefore set forth, the total current drawn by the motors on the first "on" position reaches the same steady value, assuming the armatures have not yet begun to rotate, as indicated by the substantially horizontal portion 99 of the curve 88, the difference being that, by connecting the motors to the trolley conductor in a predetermined sequence, the current does not rise nearly so rapidly and, for this reason, the voltage and current induced in the transformer 81 are not so great as are induced therein when all of the motors are connected simultaneously to the trolley. Therefore, the relay 78 may be set to cause the circuit breaker 80 to trip out when the current drawn from the trolley conductor 7 rises at a rate according to the curve 88. It follows, therefore, that this relay will not cause the circuit breaker to trip out as a result of normal accelerating current being drawn from the trolley conductor, such as may be caused by the starting of multiple-unit trains or trains in which a plurality of motor vehicles are utilized and which are controlled from a selected vehicle or car by a master controller, provided the motors of the several cars are energized or connected to the power supply in sequence in accordance with this invention.

Since various modifications may be made in the circuits and apparatus embodying the invention without departing from the spirit and scope thereof, it is desired, that only such limitations shall be placed thereon as are imposed by the prior art and the appended claims.

I claim as my invention:

1. In a control system having a rate of change circuit controlling device for a plurality of motor vehicles, each provided with a propelling motor, in combination, a source of power supply, a controller having a plurality of controlling positions, and means for connecting said motors to said power supply in a predetermined sequence in response to the actuations of said controller to one of said positions.

2. In a control system having a circuit-controlling device that is responsive to the rate of change of current in a source of power supply for a plurality of motor vehicles, each provided with a propelling motor, in combination, a source of power supply, a controller having a plurality of controlling positions, and means for connecting said motors to said power supply in a predetermined sequence from a selected locomotive in response to the actuation of said controller to its first controlling position.

3. In a control system for a plurality of motor vehicles, each provided with a propelling motor, in combination, a source of power supply, a circuit controlling device operable in response to the rate of change of current in said source, a switch for connecting each of the motors to the supply, a controller having a plurality of controlling positions, said controller being operable to close one of said switches when actuated to one of said positions, and means for effecting the closing of the other switches in a predetermined sequence in response to the closure of said switch.

4. In a control system for a plurality of motor vehicles, each provided with a propelling motor, in combination, a source of power supply, a circuit controlling device operable in response to rate of change of current in said source, means for connecting said motors to said power supply in a predetermined sequence, and means for accelerating the motors at the same rate after the motors have been connected to the source of supply.

5. In a control system for a plurality of motor vehicles, each provided with a propelling motor and an accelerating resistor, in combination, a source of power supply, a circuit controlling device operable in response to rate of change of current in said source, means for connecting a resistor in series with each of the motors to the power supply in a predetermined sequence, and means for subsequently shunting sections of said resistors substantially simultaneously to thereby effect acceleration of all of said vehicles at substantially the same rate.

6. In a control system for a plurality of motor vehicles, each provided with propelling motors, current-limiting resistors for the motors, and switches for short-circuiting sections of said resistors whereby acceleration of the vehicles may be effected step-by-step, in combination, a source of power supply, a single control circuit for each step of acceleration of the motor vehicles, a controller for governing the energization of said control circuits from a selected vehicle, whereby the switches may be closed in a predetermined sequence, means for connecting the resistors in series with the motors to the power supply, in a predetermined sequence in response to the energization of the circuit controlling the first step of acceleration, whereby the current drawn from the power supply by the motors will be caused to increase at a relatively low rate during the period the motors are first connected to the power supply, and means for disconnecting said source of power from the motor in response to the current drawn by the motors exceeding a predetermined rate of change when the first step of acceleration is initiated.

7. In a train control system for governing the operation of a plurality of vehicles, each provided with a motor, and control apparatus for connecting the motor to a source of electric power supply, in combination, a controller for energizing the control apparatus of one of said vehicles from said source of power supply, means responsive to the energization of the control apparatus on one of said vehicles for causing the energization of the control apparatus of the other of said vehicles to be delayed relative to the former, and means for controlling said source of supply in response to the rate of change of current in said source, effected upon the energization of the control apparatus of one of said vehicles.

8. In a control system, in combination, a source of electric power supply, a plurality of sections of control circuits adapted for connection to said source of electric power supply, means for controlling said source of supply in response to the rate of change of current, electro-responsive devices connected to said control circuits, and responsive to the energization of one section of said circuits for causing the other sections to be energized in a predetermined sequence, whereby the rate of change of current in said source is controlled.

9. In a control system for motor vehicles, each provided with a propelling motor, control apparatus for governing the operation of said several motors, and control circuits for the apparatus, in combination, a source of power supply, means for connecting the control circuit for the apparatus of one of said vehicles to the source of power supply, means for energizing the others of said several control circuits in a predetermined sequence, and a circuit controlling device for controlling the source of supply in accordance with the rate of change of current drawn therefrom.

10. In a control system for motor vehicles, each provided with a propelling motor, a starting resistor, line switches for connecting each of said motors and resistor in series-circuit relation to a source of power supply, and separate control circuits for governing the operation of the several line switches, in combination, a source of electric power supply, means for connecting one of said control circuits for energization to the source of power supply, thereby to close the line switch controlled therefrom, means responsive to the closing of said line switch for causing others of said control circuits to be energized in a predetermined sequence, whereby the line switches controlling the other of said motors are closed in the same sequence, and a circuit controlling device operable to interrupt the source of power supply in response to the rate of rise of current drawn therefrom by said motors.

11. In a control system, in combination, a source of power supply, means for controlling said source of supply in accordance with the rate of change of current drawn therefrom, a plurality of motors disposed for connection to said source of supply, and means responsive to the connection of one of said motors to the source of supply for effecting the connection of the remaining motors in a predetermined sequence, whereby the rate of change of current drawn from said source is controlled.

In testimony whereof, I have hereunto subscribed my name this 28th day of June, 1928.

DONALD C. WEST.